(12) United States Patent
Katsukura et al.

(10) Patent No.: US 11,249,449 B2
(45) Date of Patent: Feb. 15, 2022

(54) OPERATION TERMINAL, NON-TRANSITORY COMPUTER-READABLE MEDIUM AND AIR-CONDITIONING SYSTEM

(71) Applicant: Mitsubishi Electric Corporation, Tokyo (JP)

(72) Inventors: Makoto Katsukura, Tokyo (JP); Takuya Mukai, Tokyo (JP); Taichi Ishizaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 30 days.

(21) Appl. No.: 16/754,679

(22) PCT Filed: Nov. 6, 2017

(86) PCT No.: PCT/JP2017/039868
§ 371 (c)(1),
(2) Date: Apr. 8, 2020

(87) PCT Pub. No.: WO2019/087376
PCT Pub. Date: May 9, 2019

(65) Prior Publication Data
US 2020/0363779 A1    Nov. 19, 2020

(51) Int. Cl.
*G05B 19/042* (2006.01)
*F24F 11/30* (2018.01)
(Continued)

(52) U.S. Cl.
CPC ............ *G05B 19/042* (2013.01); *F24F 11/30* (2018.01); *F24F 11/52* (2018.01); *F24F 11/58* (2018.01);
(Continued)

(58) Field of Classification Search
CPC .......... G05B 19/042; G05B 2219/2614; F24F 11/77; F24F 11/74; F24F 11/64;
(Continued)

(56) References Cited

U.S. PATENT DOCUMENTS 8,988,247 B1 * 3/2015 Lee .................. G08C 17/02
340/815.6
9,518,751 B2 * 12/2016 Matsumoto ........... F24F 1/0063
(Continued)

FOREIGN PATENT DOCUMENTS

JP    2010-261643 A    11/2010
JP    2011-257071 A    12/2011
(Continued)

OTHER PUBLICATIONS

Japanese Office Action dated Jan. 26, 2021, issued in corresponding JP Application No. 2019-550112 (and English Machine Translation).

(Continued)

*Primary Examiner* — Ramesh B Patel
(74) *Attorney, Agent, or Firm* — Posz Law Group, PLC

(57) ABSTRACT

An operation terminal includes a display unit with a display screen to display an airflow input screen image indicating a plurality of icons corresponding to a plurality of indoor units installed in a room and a layout of the room, an input unit to receive input of a trace indicating an airflow on the display screen displaying the airflow input screen image, and a terminal-side communication unit to transmit a command for setting an air direction and air volume corresponding to the inputted trace on at least one of the plurality of indoor units.

12 Claims, 16 Drawing Sheets

(51) Int. Cl.
*F24F 11/52* (2018.01)
*F24F 11/58* (2018.01)
*F24F 11/59* (2018.01)
*F24F 11/64* (2018.01)
*F24F 11/65* (2018.01)
*F24F 11/74* (2018.01)
*F24F 11/77* (2018.01)
*F24F 11/79* (2018.01)

(52) U.S. Cl.
CPC .............. *F24F 11/59* (2018.01); *F24F 11/64* (2018.01); *F24F 11/65* (2018.01); *F24F 11/74* (2018.01); *F24F 11/77* (2018.01); *F24F 11/79* (2018.01); *G05B 2219/2614* (2013.01)

(58) Field of Classification Search
CPC .. F24F 11/65; F24F 11/30; F24F 11/52; F24F 11/58; F24F 11/59; F24F 11/79; Y02B 30/70
See application file for complete search history.

(56) References Cited

U.S. PATENT DOCUMENTS

| | | | | |
|---|---|---|---|---|
| 2010/0070085 | A1* | 3/2010 | Harrod | F24F 11/30 700/276 |
| 2012/0323375 | A1* | 12/2012 | Dean-Hendricks | F24F 8/10 700/276 |
| 2015/0061841 | A1* | 3/2015 | Lee | G08C 17/02 340/12.5 |
| 2015/0323208 | A1* | 11/2015 | Son | F24F 11/62 700/276 |
| 2016/0080465 | A1* | 3/2016 | Sasaki | G06F 3/04817 715/740 |
| 2016/0306538 | A1* | 10/2016 | Yamamoto | F24F 11/77 |
| 2018/0081614 | A1* | 3/2018 | Tsai | B60K 35/00 |
| 2019/0353380 | A1* | 11/2019 | Gillette | F24F 11/80 |
| 2019/0381443 | A1* | 12/2019 | Kim | B01D 46/429 |

FOREIGN PATENT DOCUMENTS

| | | |
|---|---|---|
| JP | 2013-76493 A | 4/2013 |
| JP | 2014-190686 A | 10/2014 |
| JP | 2016-56974 A | 4/2016 |
| WO | 2010/125804 A1 | 11/2010 |
| WO | 2016/135804 A1 | 9/2016 |
| WO | 2016/157479 A1 | 10/2016 |

OTHER PUBLICATIONS

International Search Report of the International Searching Authority dated Jan. 9, 2018 for the corresponding international application No. PCT/JP2017/039868(and English translation).

The Extended European Search Report dated Oct. 26, 2020 issued in corresponding EP application No. 17930954.7.

Japanese Office Action dated Jun. 1, 2021, issued in corresponding JP Application No. 2019-550112 (and English Machine Translation).

* cited by examiner

OPERATION TERMINAL, NON-TRANSITORY COMPUTER-READABLE MEDIUM AND AIR-CONDITIONING SYSTEM

CROSS REFERENCE TO RELATED APPLICATION

This application is a U.S. national stage application of International Patent Application No. PCT/JP2017/039868 filed on Nov. 6, 2017, the disclosure of which is incorporated herein by reference.

TECHNICAL FIELD

The present invention relates to an operation terminal, non-transitory computer-readable medium and an air-conditioning system, and in particular, to an operation terminal and a program capable of operating an indoor unit and to an air-conditioning system including the operation terminal.

BACKGROUND

An cassette-type indoor unit to be attached to the ceiling is equipped with a plurality of vanes and is recently configured so that the setting of each vane can be made independently of each other. Therefore, the user can control the airflow by making an air direction setting of each vane.

However, the air direction setting of each vane of a cassette-type indoor unit attached to the ceiling is hard to figure out, and thus the user's task of making the air direction setting of each vane so as to supply the airflow to an intended position is greatly troublesome for the user.

As an example of a countermeasure against this problem, Patent Reference 1 discloses an invention in which a region to which the airflow can be supplied when the air direction setting has been made is displayed on an operation terminal in superimposition with a camera image acquired from the indoor unit, information on environment of an airflow supply region, or the like and the user is enabled to make the air direction setting by specifying a region after a settable region is displayed.

PATENT REFERENCE

Patent Reference 1: Japanese Patent Application Publication No. 2016-56974

In the conventional technology, when the user wants to make the air direction setting of a plurality of indoor units, the user needs to make the air direction setting individually for each vane and that is troublesome.

SUMMARY

The object of the present invention, which has been made to resolve the above-described problem, is to make it possible to make the air direction setting of each vane of an indoor unit with ease.

An operation terminal according to an aspect of the present invention is an operation terminal to make settings to a plurality of indoor units installed in a room to condition air in the room, including: a display unit with a display screen to display an airflow input screen image indicating a plurality of icons corresponding to the plurality of indoor units and a layout of the room; an input unit to receive input of a trace indicating an airflow on the display screen displaying the airflow input screen image; and a terminal-side communication unit to transmit a first command for setting an air direction and air volume corresponding to the trace on at least one of the plurality of indoor units.

A program according to an aspect of the present invention is a program that causes a computer to function as an operation terminal to make settings to a plurality of indoor units installed in a room in order to condition air in the room, wherein the program causes the computer to function as: a display unit with a display screen to display an airflow input screen image indicating a plurality of icons corresponding to the plurality of indoor units and a layout of the room; an input unit that receives input of a trace indicating an airflow on the display screen displaying the airflow input screen image; and a terminal-side communication unit to transmit a first command for setting an air direction and air volume corresponding to the trace on at least one of the plurality of indoor units.

An air-conditioning system according to an aspect of the present invention is an air-conditioning system including a plurality of indoor units installed in a room in order to condition air in the room and an operation terminal to make settings to the plurality of indoor units, wherein the operation terminal includes: a display unit with a display screen to display an airflow input screen image indicating a plurality of icons corresponding to the plurality of indoor units and a layout of the room; an input unit to receive input of a trace indicating an airflow on the display screen displaying the airflow input screen image; and a terminal-side communication unit to transmit a first command for setting an air direction and air volume corresponding to the trace on at least one of the plurality of indoor units.

According to an aspect of the present invention, the air direction setting of each vane of an indoor unit can be made with ease.

DETAILED DESCRIPTION

Figure 1:
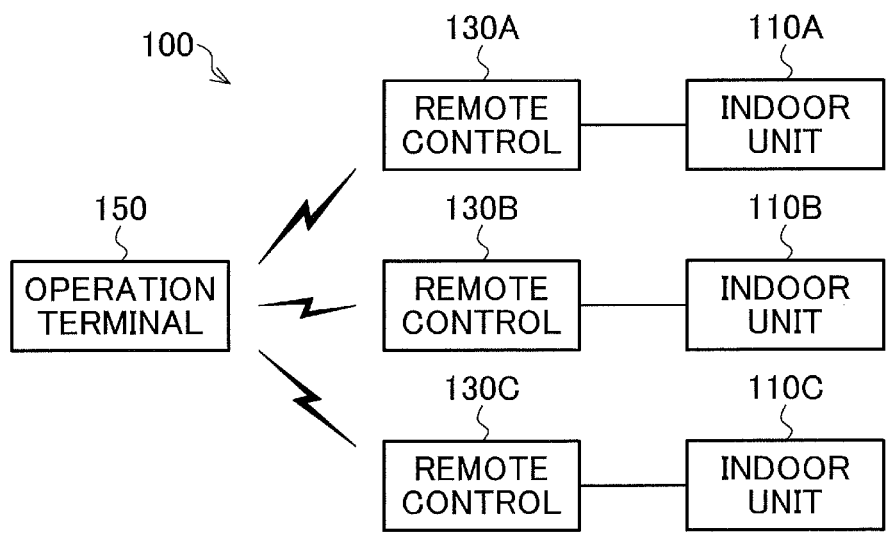
FIG. 1 is a block diagram schematically showing the configuration of an air-conditioning system according to an embodiment.

FIG. 1 is a block diagram schematically showing the configuration of an air-conditioning system 100 according to an embodiment.

The air-conditioning system 100 includes indoor units 110A, 110B and 110C, remote controllers (remote controls) 130A, 130B and 130C as equipment management devices, and an operation terminal 150.

The indoor units 110A, 110B and 110C are installed in a room in order to condition air in the room. The indoor unit 110A is controlled by the remote control 130A, the indoor unit 110B is controlled by the remote control 130B, and the indoor unit 110C is controlled by the remote control 130C.

Each of the indoor units 110A, 110B and 110C will be referred to as an indoor unit 110 when it is not particularly necessary to discriminate among the indoor units 110A, 110B and 110C. Each of the remote controls 130A, 130B and 130C will be referred to as a remote control 130 when it is not particularly necessary to discriminate among the remote controls 130A, 130B and 130C.

The indoor unit 110 and the remote control 130 are connected to each other by wire. The remote control 130 and the operation terminal 150 are connected to each other by radio.

Incidentally, it is also possible to connect the indoor unit 110 and the remote control 130 to each other by radio.

The indoor unit 110 has air outlet ports in four directions, and each air outlet port is provided with a vane for controlling the airflow in the horizontal direction and a vane for controlling the airflow in the vertical direction. The indoor unit 110 is, for example, an indoor unit of the ceiling cassette type for air conditioning, having air outlet ports in four directions.

The operation terminal 150 communicates with the remote controls 130, thereby being able to read out information such as settings of an air direction and air volume of each indoor unit 110, outlet temperature, and intake temperature. The operation terminal 150 is configured to be able to display data to the user, receive operation inputs from the user, and so forth. The operation terminal 150 is, for example, a smartphone, a tablet terminal or the like. The operation terminal 150 has a touch screen of the electrostatic type or a color liquid crystal display.

Figure 2:
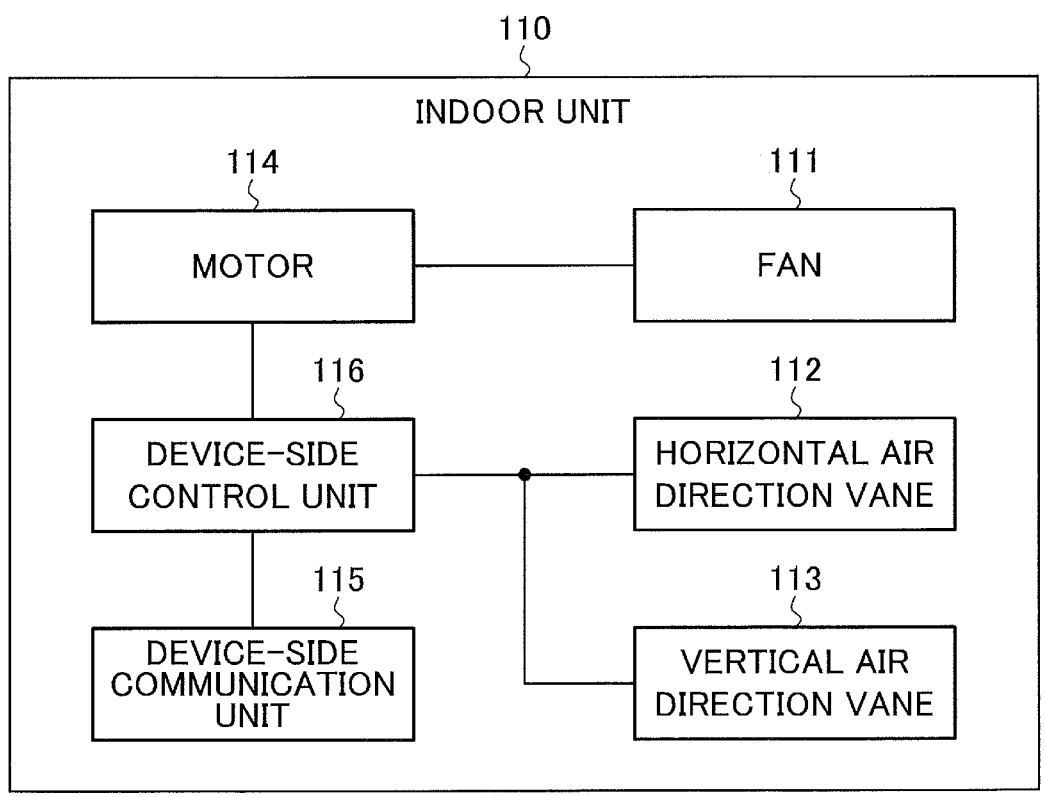
FIG. 2 is a block diagram schematically showing the configuration of an indoor unit.

FIG. 2 is a block diagram schematically showing the configuration of the indoor unit 110.

In FIG. 2, only parts relevant to this embodiment are shown.

The indoor unit 110 includes a fan 111, horizontal air direction vanes 112, vertical air direction vanes 113, a motor 114, a device-side communication unit 115 and a device-side control unit 116.

The fan 111, as a device for sending out air, discharges air conditioned inside the indoor unit 110 to the outside of the indoor unit 110. The fan 111 is capable of adjusting the amount of the air (air volume) sent out according to motive power from the motor 114. For example, the fan 111 may be a sirocco fan.

The horizontal air direction vane 112 is a device that changes the direction of the air from the fan 111 in the horizontal direction by moving a vane functioning as an air guide. In this embodiment, the indoor unit 110 has four air outlet ports and four horizontal air direction vanes 112 corresponding to the four air outlet ports. Each horizontal air direction vane 112 is capable of individually changing the direction of the vane.

The vertical air direction vane 113 is a device that changes the direction of the air from the fan 111 in the vertical direction by moving a vane functioning as an air guide. In this embodiment, the indoor unit 110 has four air outlet ports and four vertical air direction vanes 113 corresponding to the four air outlet ports. Each vertical air direction vane 113 is capable of individually changing the direction of the vane.

The motor 114 supplies motive power to the fan 111. For example, the volume of the air sent out from the fan 111 can be changed by changing the revolution speed of the motor 114.

Here, an air volume adjustment unit that adjusts the air volume of the indoor unit 110 is formed by the fan 111 and the motor 114.

Further, an air direction adjustment unit that adjusts the air directions of the indoor unit 110 is formed by the horizontal air direction vanes 112 and the vertical air direction vanes 113.

The device-side communication unit 115 is a communication interface for performing the communication with the remote control 130.

The device-side control unit 116 controls processes in the indoor unit 110. For example, the device-side control unit 116 adjusts the volume of the air sent out from the fan 111 by controlling the motor 114 according to a command received by the device-side communication unit 115. Further, the device-side control unit 116 adjusts the direction of the air from the fan 111 by changing the directions of the horizontal air direction vanes 112 and the vertical air direction vanes 113 according to a command received by the device-side communication unit 115.

Figure 3A:
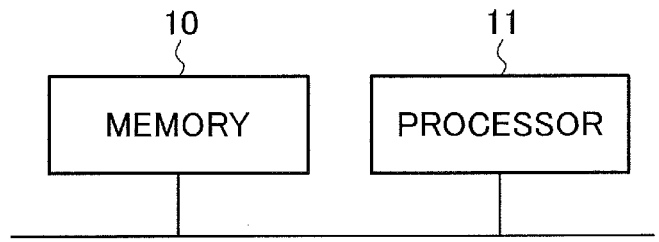
FIGS. 3A and 3B are block diagrams showing hardware configuration examples.

Part or the whole of the device-side control unit 116 described above can be implemented by a memory 10 and a processor 11 such as a CPU (Central Processing Unit) for executing a program stored in the memory 10 as shown in FIG. 3A, for example. Such a program may be provided via a network, or provided in the form of being stored in a record medium. Namely, such a program may be provided as a program product, for example.

Figure 3B:
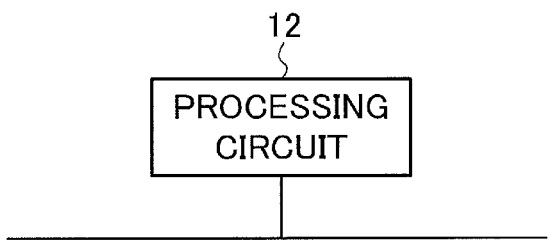

It is also possible to form part or the whole of the device-side control unit 116 with a processing circuit 12 such as a single circuit, a combined circuit, a programmed processor, a parallelly programmed processor, an ASIC (Application Specific Integrated Circuit) or an FPGA (Field Programmable Gate Array) as shown in FIG. 3B, for example.

Figure 4:
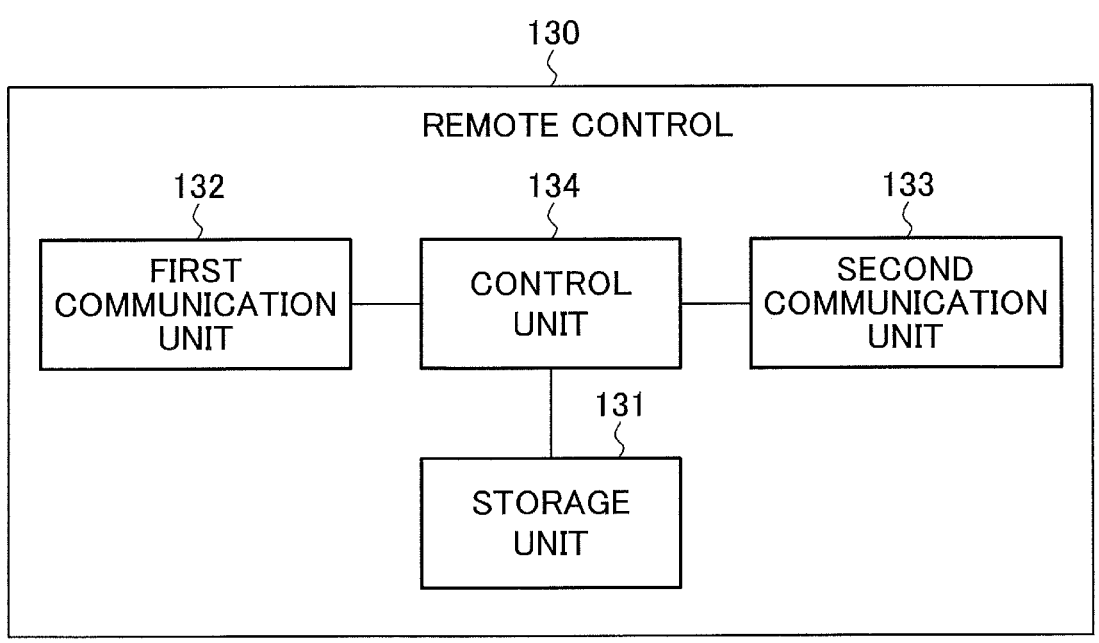
FIG. 4 is a block diagram schematically showing the configuration of a remote control.

FIG. 4 is a block diagram schematically showing the configuration of the remote control 130.

Also in FIG. 4, only parts relevant to this embodiment are shown.

The remote control 130 includes a storage unit 131, a first communication unit 132, a second communication unit 133 and a control unit 134.

Although not illustrated, the remote control 130 has an Light Emitting Diode (LED) for indicating operational status of the indoor unit 110.

The storage unit 131 stores information necessary for processes in the remote control 130. For example, the storage unit 131 stores information such as the settings of the air direction and the air volume, the outlet temperature, and the intake temperature in regard to the indoor unit 110 connected to the corresponding remote control 130.

The first communication unit 132 is a communication interface for performing the communication with the operation terminal 150. In this embodiment, the first communication unit 132 performs the communication with the operation terminal 150 by using radio.

The second communication unit 133 is a communication interface for performing the communication with the indoor unit 110.

The control unit 134 controls processes in the remote control 130. For example, the control unit 134 responds to a request for confirmation of the connected indoor unit 110, from the operation terminal 150, via the first communication unit 132. In the response mentioned here, the control unit 134 is assumed to notify the operation terminal 150 of identification information capable of identifying the connected indoor unit 110.

Further, the control unit 134 converts a command (source command) from the operation terminal 150 into a command (converted command) interpretable by the indoor unit 110.

Part or the whole of the control unit 134 described above can be implemented by a memory 10 and a processor 11 such as a CPU for executing a program stored in the memory 10 as shown in FIG. 3A, for example. Such a program may be provided via a network, or provided in the form of being stored in a record medium. Namely, such a program may be provided as a program product, for example.

It is also possible to form part or the whole of the control unit 134 with a processing circuit 12 such as a single circuit, a combined circuit, a programmed processor, a parallelly programmed processor, an ASIC or an FPGA as shown in FIG. 3B, for example.

Figure 5:
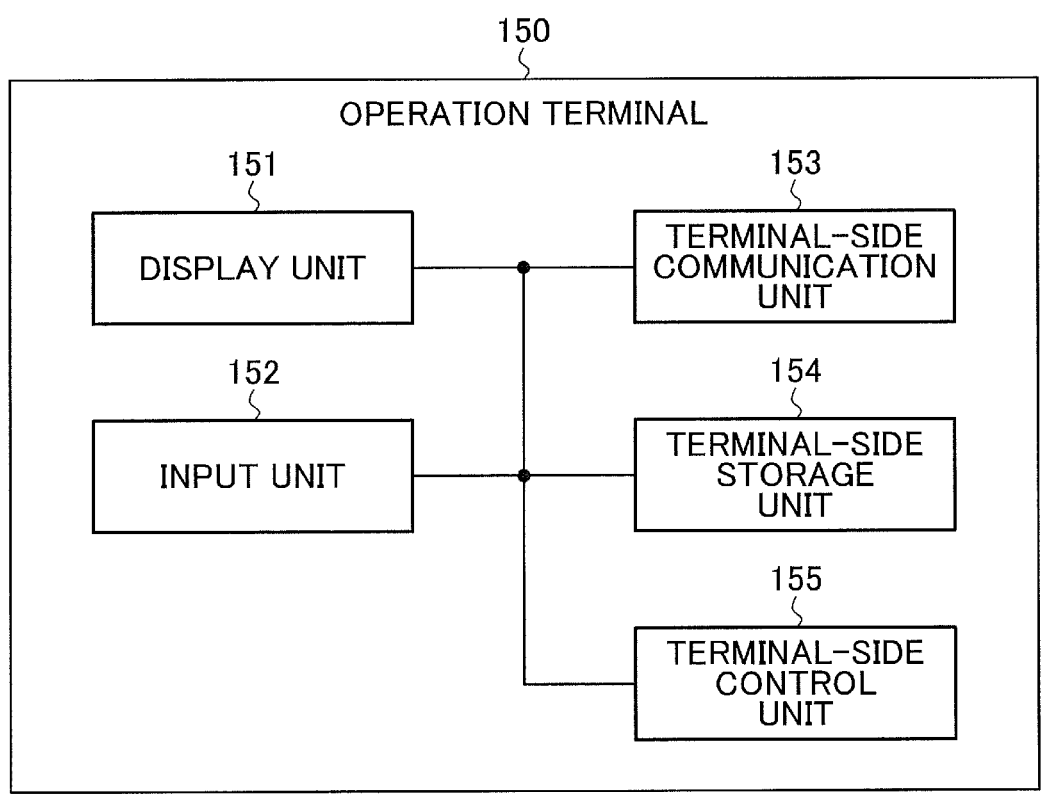
FIG. 5 is a block diagram schematically showing the configuration of an operation terminal.

FIG. 5 is a block diagram schematically showing the configuration of the operation terminal 150.

Also in FIG. 5, only parts relevant to this embodiment are shown.

The operation terminal 150 includes a display unit 151, an input unit 152, a terminal-side communication unit 153, a terminal-side storage unit 154 and a terminal-side control unit 155.

The display unit 151 has a display screen for displaying various types of screen images.

The input unit 152 receives operation inputs from the user. For example, the input unit 152 scans the position of an operation performed on the display screen of the display unit 151 by the user, determines a trace or a pressing position of the operation, and thereby receives a command from the user.

Specifically, the display unit 151 and the input unit 152 may be a touch screen.

The terminal-side communication unit 153 is a communication interface for performing the communication with the remote controls 130. In this embodiment, the terminal-side communication unit 153 performs the communication with the remote controls 130 by using radio.

The terminal-side storage unit 154 stores information necessary for processes in the operation terminal 150. For example, the terminal-side storage unit 154 stores building information indicating floors of a building in which the indoor units 110 are installed and floor information indicating the shape and the size of a room in which the indoor units 110 are installed in regard to each floor.

The terminal-side control unit 155 controls processes in the operation terminal 150. For example, the terminal-side control unit 155 generates a command for making a setting of an indoor unit 110 and makes the terminal-side communication unit 153 transmit the generated command.

For example, when a straight line is inputted as a trace indicating an airflow, the terminal-side control unit 155 determines the direction from the starting point to the endpoint of the straight line as the horizontal air direction of one indoor unit 110 which corresponds to one icon and is included in the plurality of indoor units 110, determines the air volume of the one indoor unit 110 so that the air volume from the one indoor unit 110 increases with the increase in the length of the straight line, and generates a command for setting the determined air direction and the determined air volume to the one indoor unit 110.

Part or the whole of the terminal-side control unit 155 described above can be implemented by a memory 10 and a processor 11 such as a CPU for executing a program stored in the memory 10 as shown in FIG. 3A, for example. Such a program may be provided via a network, or provided in the form of being stored in a record medium. Namely, such a program may be provided as a program product, for example.

It is also possible to form part or the whole of the terminal-side control unit 155 with a processing circuit 12 such as a single circuit, a combined circuit, a programmed processor, a parallelly programmed processor, an ASIC or an FPGA as shown in FIG. 3B, for example.

Figure 6:
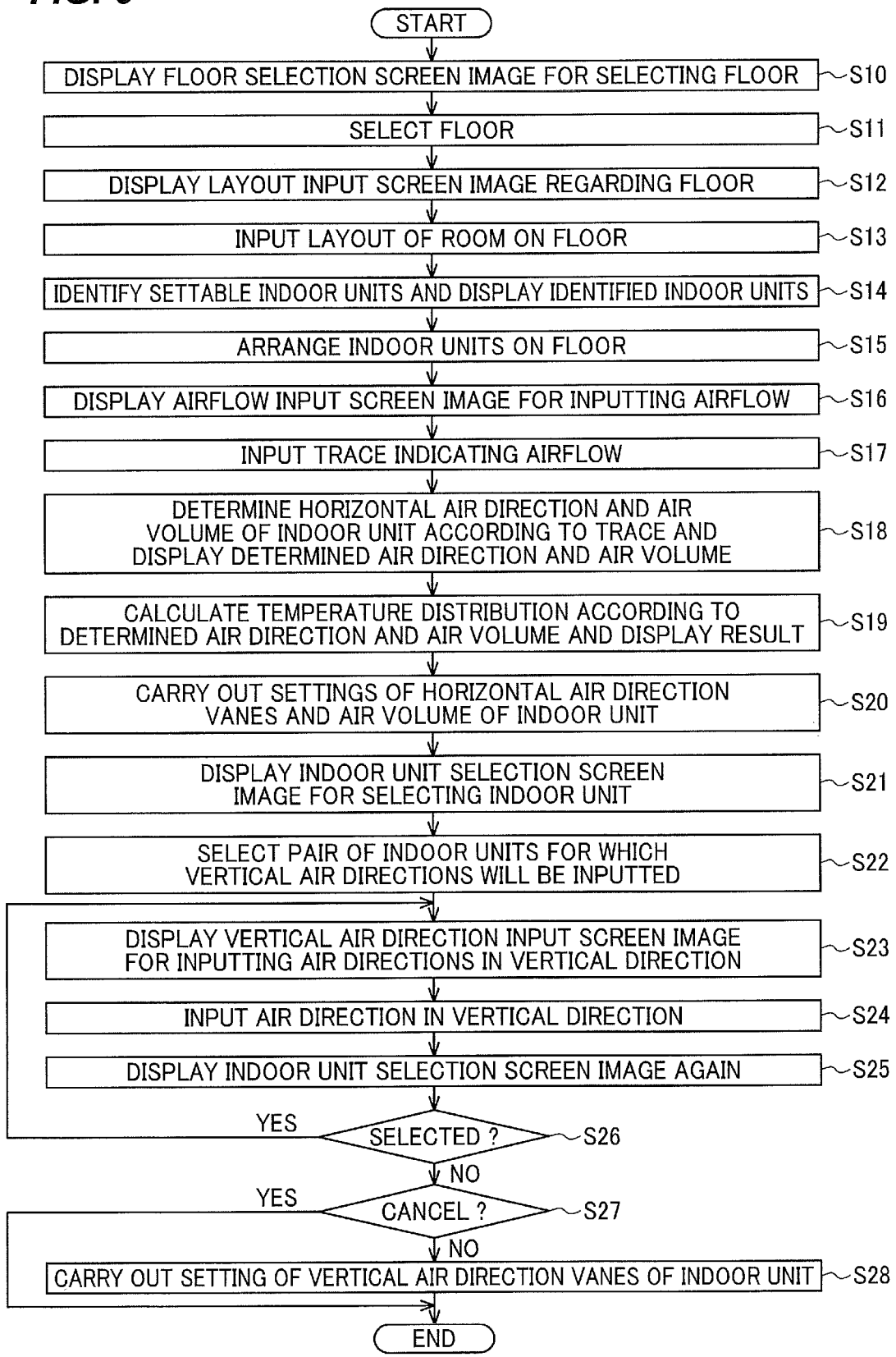
FIG. 6 is a flowchart for explaining an operation in which the user makes settings of air directions and air volumes of a plurality of indoor units with an operation terminal easily.

FIG. 6 is a flowchart for explaining an operation in which the user makes settings of the air direction and the air volume of each indoor unit 110 with an operation terminal 150 easily.

When the user inputs a command for executing an application for a setting operation to the input unit 152 of the operation terminal 150, the terminal-side control unit 155 makes the display unit 151 display a floor selection screen image based on the building information stored in the terminal-side storage unit 154 (S10).

Figure 7:
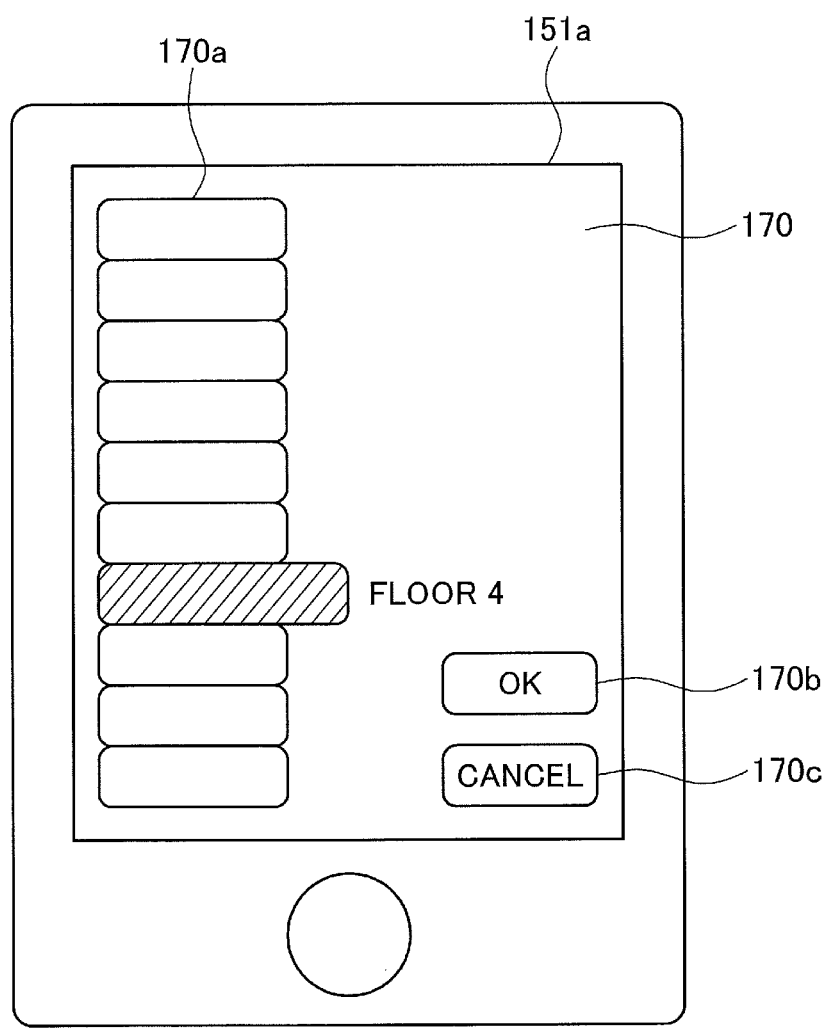
FIG. 7 is a schematic diagram showing an example of a floor selection screen image.

FIG. 7 is a schematic diagram showing an example of the floor selection screen image.

As shown in FIG. 7, the floor selection screen image 170 includes a partial building image 170a schematically showing floors, an OK button 170b as an input region for representing completion of the floor selection, and a CANCEL button 170c as an input region for representing cancellation of the floor selection.

The floor selection screen image 170 is displayed on the display screen 151a of the display unit 151.

Subsequently, the user selects a floor, for which the settings of the air direction and the air volume will be made, by using the floor selection screen image 170 (S11).

For example, the user selects the floor, as the target of the settings, from the partial image 170a. As shown in FIG. 7, when the floor is selected, the floor number of the selected floor is displayed in the floor selection screen image 170. When the user selects the floor and presses the OK button 170b, the process proceeds to step S12. When the user presses the CANCEL button 170c, the floor selection is canceled and the application for the setting operation ends.

In the step S12, based on the floor information stored in the terminal-side storage unit 154, the terminal-side control unit 155 scales down the size of the room on the selected floor in which the indoor units 110 have been installed and thereby makes the display unit 151 display a layout input screen image for inputting details of the layout of the room.

Figure 8:
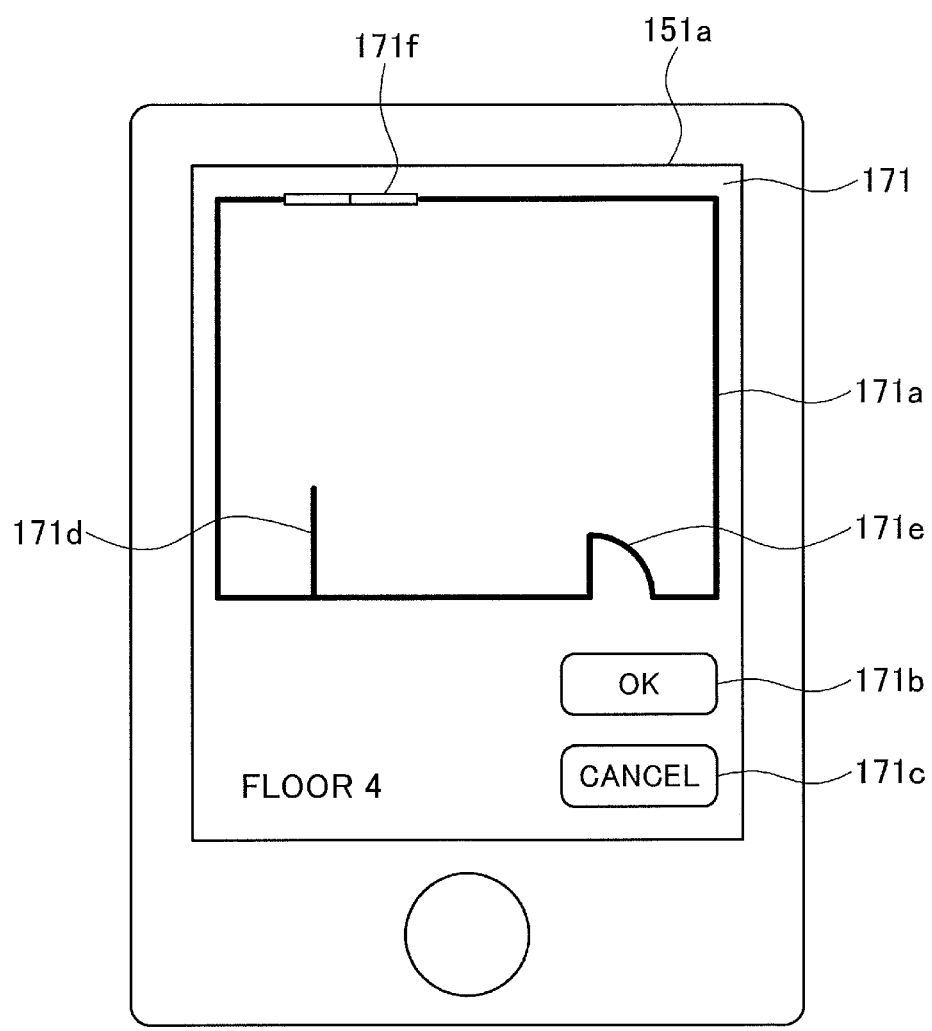
FIG. 8 is a schematic diagram showing an example of a layout input screen image.

FIG. 8 is a schematic diagram showing an example of the layout input screen image.

As shown in FIG. 8, the layout input screen image 171 includes a partial image 171a schematically showing the layout of the room in which the indoor units 110 have been installed on the selected floor, an OK button 171b as an input region for representing completion of the input, and a CANCEL button 171c as an input region for representing cancellation of the input. The partial image 171a in this example is a sketch drawing of the corresponding room.

Incidentally, the layout input screen image 171 is displayed on the display screen 151a of the display unit 151.

Subsequently, the user inputs the details of the layout of the room to the layout input screen image 171 (S13).

For example, as shown in FIG. 8, the user can input room arrangement by inputting a partition 171d to the layout input screen image 171. The user can also input a door 171e, a window 171f or the like.

Incidentally, although not illustrated, object images of objects such as the partition 171d, the door 171e and the window 171f to be inputted as the details of the layout have previously been prepared, and the user specifies an object to be arranged with the input unit 152, by which the object image of the specified object is displayed in the layout input screen image 171. Then, the user arranges the displayed object image at a desired position in the layout input screen image 171.

When the user presses the OK button 171b, the process proceeds to step S14. When the user presses the CANCEL button 171c, the process returns to the step S10.

Incidentally, the details of the layout are inputted by the user in this example, but information on the detailed layout of rooms formed on the floor may be included in the floor information previously stored in the operation terminal 150, for example. In such a case, the user is relieved of the trouble of inputting the details of the layout.

In the step S14, the terminal-side control unit 155 communicates with remote controls 130 via the terminal-side communication unit 153, thereby identifies indoor units 110 existing in the room on the selected floor, and makes the display unit 151 display a floor screen image that includes the layout including the object images inputted in the step S13 and icons corresponding to the identified indoor units 110.

Here, in this embodiment, the remote controls 130 and the operation terminal 150 are assumed to be connected by short-range wireless communication such as Bluetooth (registered trademark). Thus, on the selected floor, the operation terminal 150 is assumed to be able to communicate exclusively with remote controls 130 of indoor units 110 installed in the room on the floor.

Then, the terminal-side control unit 155 sends a request for confirmation of the indoor units 110 to the remote controls 130 via the terminal-side communication unit 153, receives responses to the request, and thereby identifies the indoor units 110 existing in the room on the selected floor.

Figure 9:
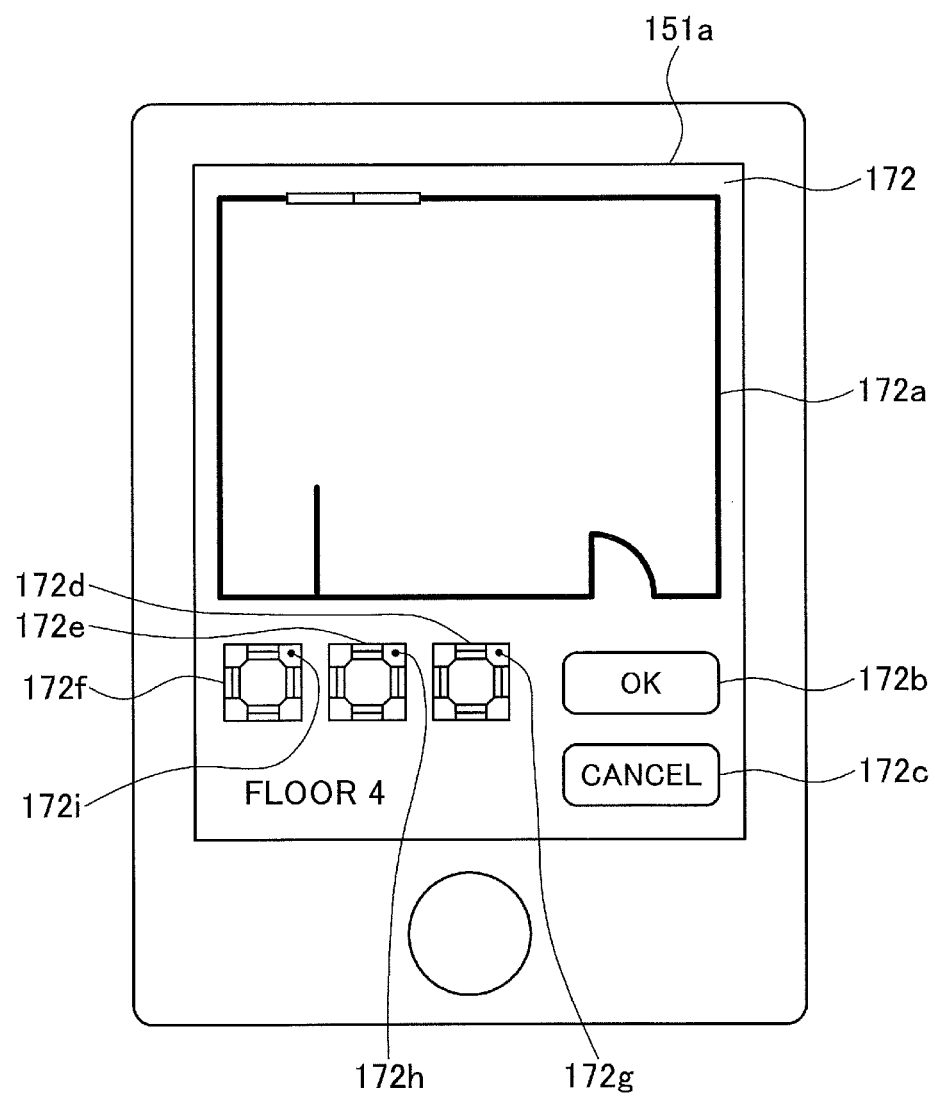
FIG. 9 is a schematic diagram showing an example of a floor screen image.

FIG. 9 is a schematic diagram showing an example of the floor screen image.

The floor screen image 172 includes a partial image 172a showing the layout including the object images inputted in the step S13, an OK button 172b as an input region for representing completion of the arrangement, a CANCEL button 172c as an input region for representing cancellation of the arrangement, and icons 172d, 172e and 172f as images (indoor unit images) indicating the identified indoor units 110.

Incidentally, the floor screen image 172 is displayed on the display screen 151a of the display unit 151.

Further, the terminal-side control unit 155 is assumed to have recognized the correspondence between each of the displayed icons 172d, 172e and 172f and each of the indoor units 110 identified in the step S14.

Subsequently, the user arranges the icons 172d, 172e and 172f corresponding to the indoor units 110 at appropriate positions in the partial image 172a showing the layout of the room (S15).

For example, the user arranges the icons 172d, 172e and 172f at appropriate positions in the layout of the room by use of the display unit 151 and the input unit 152 by dragging each of the icons 172d, 172e and 172f with a finger.

Incidentally, when the user touches one of the icons 172d, 172e and 172f, the terminal-side control unit 155 sends a command for vertically moving the vertical air direction vanes 113 to the remote control 130 managing the corresponding indoor unit 110. The remote control 130 operates the vertical air direction vanes 113 of the connected indoor unit 110 so that the vertical air direction vanes 113 move in the vertical direction for a short time.

Through this operation, the user can recognize the correspondence between the icons 172d, 172e and 172f and the indoor units 110.

Alternatively, when the user touches one of the icons 172d, 172e and 172f, the terminal-side control unit 155 may send a command for making the LED indicating the operational status blink to the remote control 130 managing the corresponding indoor unit 110.

Further, on the indoor unit 110, a mark as an identification sign for determining the positions (directions) of the vertical air direction vanes 113 and the horizontal air direction vanes 112 with respect to the room is drawn at one of the four corners of the indoor unit 110, for example. Also on icons 172d, 172e, 172f, marks 172g, 172h, 172i are drawn at corresponding positions. The user can adjust the positions of the vertical air direction vanes 113 and the horizontal air direction vanes 112 with respect to the room by rotating the icons 172d, 172e, 172f so as to adjust the positions of the marks 172g, 172h, 172i to the positions of the marks drawn on the indoor units 110.

When the user presses the OK button 172b, the process proceeds to step S16. When the user presses the CANCEL button 172c, the process returns to the step S12.

Incidentally, the icons 172d, 172e and 172f corresponding to the indoor units 110 are arranged in the partial image 172a showing the layout of the room by the user in this example, but information indicating the positions and the directions of the indoor units 110 installed in the room may be included in the floor information previously stored in the operation terminal 150, for example. In such a case, the user is relieved of the trouble of arranging the icons 172d, 172e and 172f corresponding to the indoor units 110.

In the step S16, the terminal-side control unit 155 makes the display unit 151 display an airflow input screen image for inputting an airflow.

Figure 10:
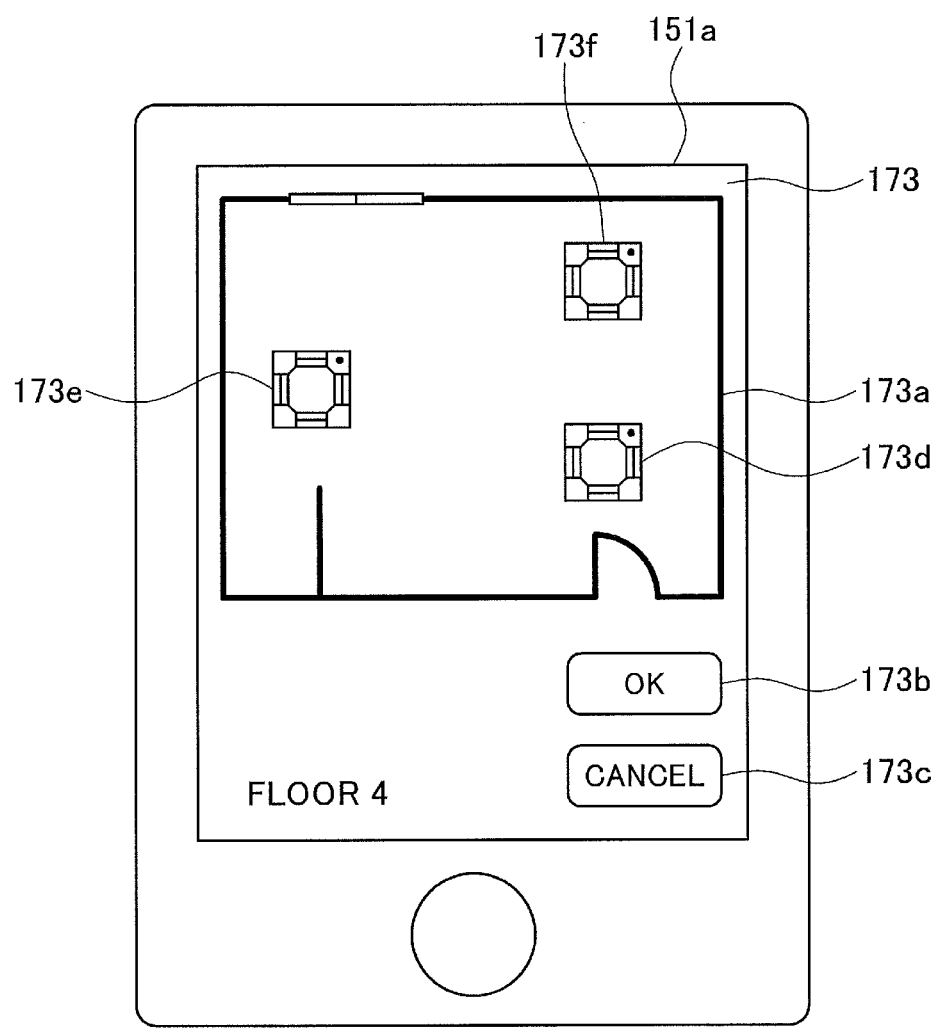
FIG. 10 is a schematic diagram showing an example of an airflow input screen image.

FIG. 10 is a schematic diagram showing an example of the airflow input screen image.

As shown in FIG. 10, the airflow input screen image 173 includes a partial image 173a schematically showing the layout of the room, an OK button 173b as an input region for representing completion of the input of the airflow, and a CANCEL button 173c as an input region for representing cancellation of the input.

Incidentally, the airflow input screen image 173 is displayed on the display screen 151a of the display unit 151.

In the partial image 173a, icons 173d, 173e and 173f corresponding to the indoor units 110 are arranged at the positions inputted in the step S15.

Subsequently, the user inputs a trace indicating an airflow to the airflow input screen image 173 (S17).

Figure 11:
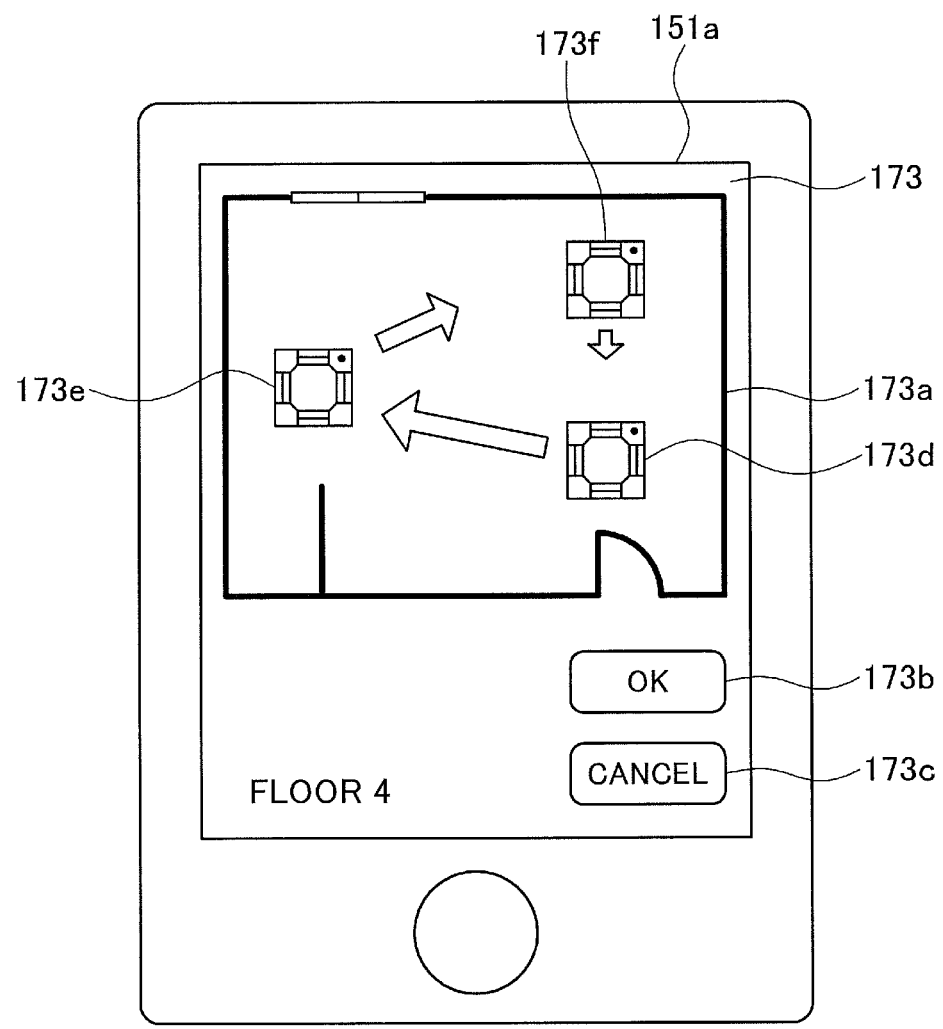
FIG. 11 is a schematic diagram showing an example of inputs to the airflow input screen image.

For example, as shown in FIG. 11, by use of the display unit 151 and the input unit 152, the user performs a drag with a finger from at least one of the icons 173d, 173e and 173f towards a direction of making air flow so that the trace becomes longer with the increase in the air volume. As shown in FIG. 11, in the airflow input screen image 173, each arrow in the direction of the drag is displayed. When the drag from the icon 173d, 173e or 173f is performed for a long distance, a long and thick arrow is displayed. This indicates that a strong airflow is blown out (high air volume).

In this embodiment, the user is assumed to input each airflow as a straight line.

When the user presses the OK button 173b, the process proceeds to step S18. When the user presses the CANCEL button 173c, the process returns to the step S14.

In the step S18, based on the trace inputted in the step S17, the terminal-side control unit 155 determines the air direction and the air volume of the indoor unit 110, determines the directions of the horizontal air direction vanes 112 of the indoor unit 110 based on the determined air direction, and determines the air volume from the fan 111 of the indoor unit 110. Then, the terminal-side control unit 155 makes the display unit 151 display an air direction air volume confirmation screen image indicating the determined directions of the horizontal air direction vanes 112 (setting of the horizontal air direction vanes 112) and the determined air volume from the fan 111 (setting of the fan 111).

Figure 12:
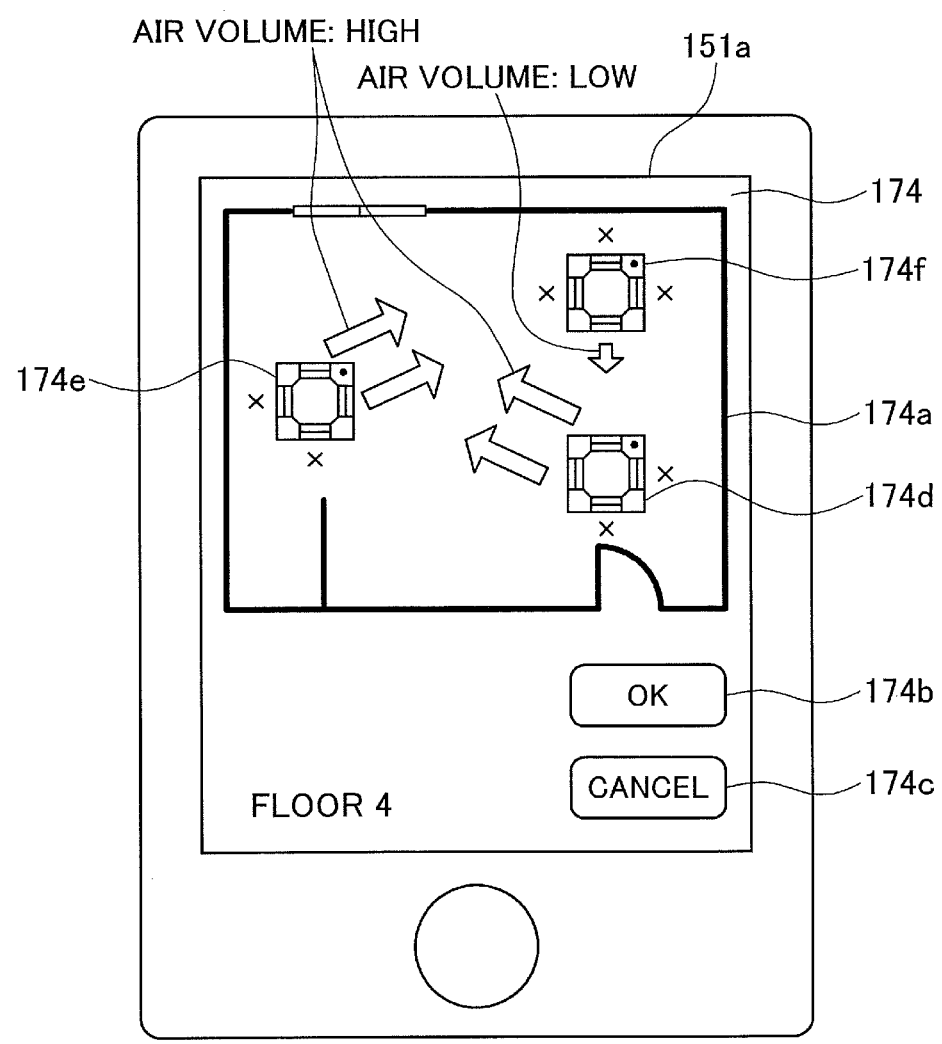
FIG. 12 is a schematic diagram showing an example of an air direction air volume confirmation screen image.

FIG. 12 is a schematic diagram showing an example of the air direction air volume confirmation screen image.

As shown in FIG. 12, the air direction air volume confirmation screen image 174 includes a partial image 174a schematically showing the layout of the room, an OK button 174b as an input region for representing completion of confirmation of the air directions and the air volumes, and a CANCEL button 174c as an input region for representing cancellation of the air directions and the air volumes.

Incidentally, the air direction air volume confirmation screen image 174 is displayed on the display screen 151a of the display unit 151.

In the partial image 174a, icons 174d, 174e and 174f corresponding to the indoor units 110 are arranged at appropriate positions, and the directions of the horizontal air direction vanes 112 of each indoor unit 110 indicated by each of the icons 174d, 174e, 174f and the air volume from the fan 111 of each indoor unit 110 indicated by each of the icons 174d, 174e, 174f are shown.

Figure 13:
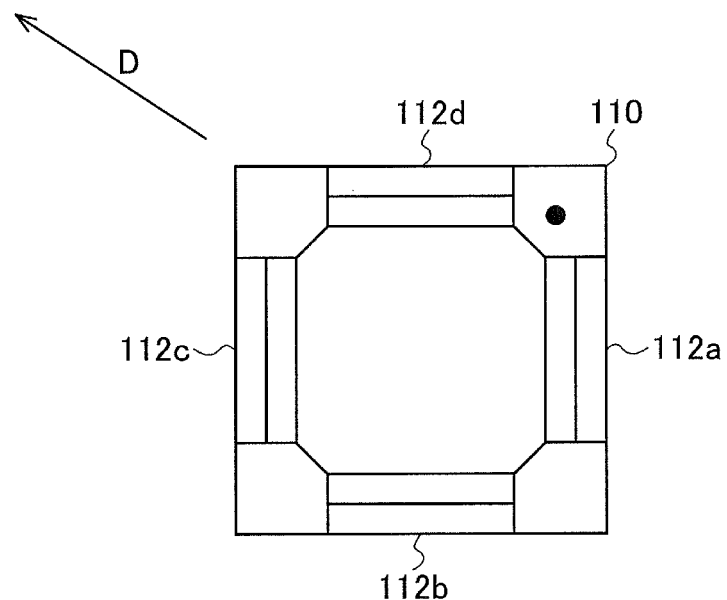
FIG. 13 is a schematic diagram for explaining a method of assigning an air direction.

Here, a description of a method of determining the directions of the horizontal air direction vanes 112 and the air volume from the fan 111 in regard to an indoor unit 110 will be given. As shown in FIG. 13, it is assumed that the indoor unit 110 includes four horizontal air direction vanes 112a, 112b, 112c and 112d and the direction of the trace (the direction from the starting point to the endpoint of the inputted straight line) inputted in the step S17 is the direction D.

Since the direction D heads towards the inside of the indoor unit 110 in regard to the horizontal air direction vanes 112a and 112b, the terminal-side control unit 155 does not sets the direction of the horizontal air direction vanes 112a and 112b.

Since the direction D heads towards the outside of the indoor unit 110 in regard to the horizontal air direction vanes 112c and 112d, the terminal-side control unit 155 sets the direction of the horizontal air direction vanes 112c and 112d. The direction set here is the direction D.

Further, the air volume from the fan 111 is determined according to the length of the trace inputted in the step S17. For example, air volumes to be set for the fan 111 of the indoor unit 110 may be previously associated with predetermined ranges of the lengths.

Incidentally, the length of the trace may also be a length actually inputted by use of the display unit 151 and the input unit 152. It is also possible to magnify the length actually inputted by use of the display unit 151 and the input unit 152 to a length in the room based on the reduction scale of the room displayed on the display unit 151.

As shown in FIG. 12, "x" marks are displayed at positions adjacent to horizontal air direction vanes 112 for which no directions have been set, and arrows indicating the set directions and character strings indicating the air volumes of the fans 111 are displayed at positions adjacent to horizontal air direction vanes 112 for which the directions have been set.

Incidentally, it is assumed that one air volume is set to the fan 111 of one indoor unit 110.

Further, a horizontal air direction vane 112 or a vertical air direction vane 113 for which no direction has been set is left in a initial state or set in a closed state.

When the user presses the OK button 174b, the process proceeds to step S19. When the user presses the CANCEL button 174c, the process returns to the step S16.

In the step S19, the terminal-side control unit 155 estimates (calculates) temperature distribution in the room based on the direction of each horizontal air direction vane 112 and the air volumes from the fans 111 determined in the step S18 and makes the display unit 151 display a temperature distribution confirmation screen image indicating the result of the estimation.

For example, the terminal-side control unit 155 acquires the intake temperature and the outlet temperature of each indoor unit 110 from each remote control 130. When these values cannot be acquired, previously set values are used.

The temperature of air from the indoor unit 110 just after coming out of the indoor unit 110 is assumed to coincide with the outlet temperature. This temperature is assumed to coincide with the intake temperature, that is, room temperature, at a position 5 m away when the air volume is high, at a position 3 m away when the air volume is middle, and at a position 1 m away when the air volume is low. The temperature in space between these positions is assumed to be calculated by linearly interpolating temperatures between the outlet temperature and the intake temperature.

Figure 14:
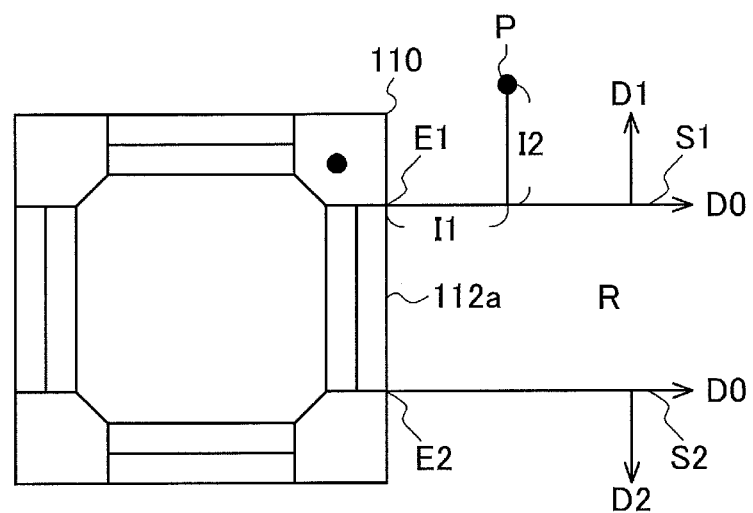
FIG. 14 is a schematic diagram for explaining a method of calculating temperature distribution.

For example, as shown in FIG. 14, it is assumed that the direction set to the horizontal air direction vane 112a of the indoor unit 110 is the direction D0 and the air volume from the fan 111 of the indoor unit 110 is high.

First, the terminal-side control unit 155 calculates the temperature distribution in a region extending in the direction D0 from the horizontal air direction vane 112a, that is, a region R between a line segment S1 extending in the direction D0 from an end E1 of the horizontal air direction vane 112a and a line segment S2 extending in the direction D0 from an end E2 of the horizontal air direction vane 112a in FIG. 14.

When the outlet temperature is 10° C. and the intake temperature is 30° C., in this region R, the temperature at a position 1m away from the indoor unit 110 is 14° C., the temperature at a position 2 m away from the indoor unit 110 is 18° C., the temperature at a position 3 m away from the indoor unit 110 is 22° C., the temperature at a position 4 m away from the indoor unit 110 is 26° C., and the temperature at a position 5 m away from the indoor unit 110 is 30° C.

Subsequently, the terminal-side control unit 155 calculates the temperature distribution in the other regions. In the other regions, the distance from the indoor unit 110 is calculated by adding a distance in the direction D0 and a distance in a direction D1 or a direction D2 orthogonal to the direction D0. For example, at a position P included in a region above the line segment S1 in FIG. 14, the distance from the indoor unit 110 is calculated by adding the distance I1 in the direction D0 from the end E1 and the distance I2 in the direction D1 from the line segment S1. Specifically, when the distance I1 is 1 m and the distance I2 is 1 m, the temperature at the position P is calculated as 18° C. since the position P is 2 m away from the indoor unit 110.

Incidentally, the above-described method of calculation is just an example; the temperature may be calculated by using a different method of calculation.

Figure 15:
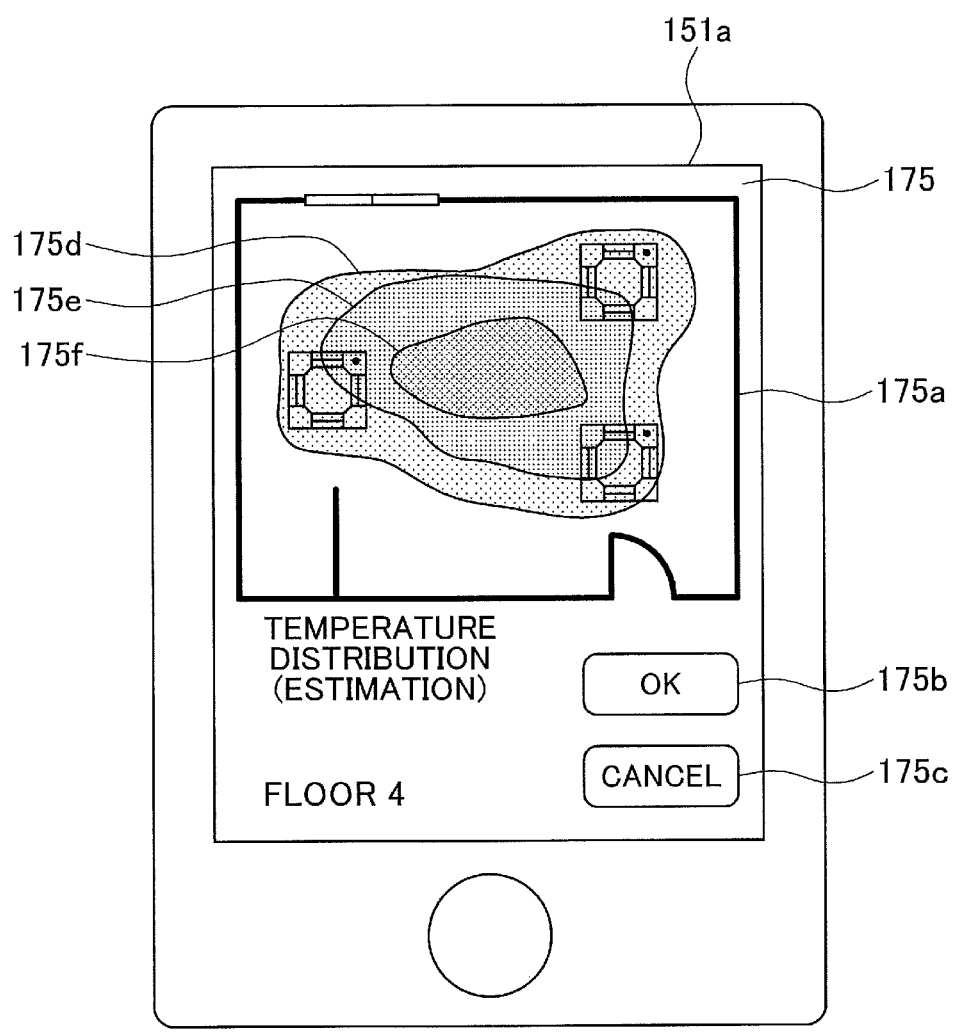
FIG. 15 is a schematic diagram showing an example of a temperature distribution confirmation screen image.

FIG. 15 is a schematic diagram showing an example of the temperature distribution confirmation screen image.

As shown in FIG. 15, the temperature distribution confirmation screen image 175 includes a partial image 175a schematically showing the layout of the room, an OK button 175b as an input region for representing completion of confirmation of the temperature distribution, and a CANCEL button 175c as an input region for representing cancellation.

Incidentally, the temperature distribution confirmation screen image 175 is displayed on the display screen 151a of the display unit 151.

In the partial image 175a, the temperatures calculated by the terminal-side control unit 155 are classified into previously determined multiple temperature ranges, and regions 175d, 175e and 175f representing the temperature ranges of the classification are shown.

When the user presses the OK button 175b, the process proceeds to step S20; when the user presses the CANCEL button 175c, the process returns to the step S16.

In the step S20, the operation terminal 150 sets the directions of the horizontal air direction vanes 112 and the air volume of each indoor unit 110. In this embodiment, each indoor unit 110 includes a plurality of horizontal air direction vanes 112 and the direction can be set individually for each of the plurality of horizontal air direction vanes 112, and thus the operation terminal 150 sets the direction of each of the horizontal air direction vanes 112.

For example, the terminal-side control unit 155 of the operation terminal 150 generates a command indicating the setting of the direction of each horizontal air direction vane 112 and the setting of the air volume (first command) for each indoor unit 110. Then, the terminal-side control unit 155 sends the generated command to the terminal-side communication unit 153, and the terminal-side communication unit 153 transmits the command to each remote control 130.

In each remote control 130, the first communication unit 132 receives the command regarding the indoor unit 110 connected to each remote control 130 and sends the received command to the control unit 134. The control unit 134 converts the received command into a command for the indoor unit 110 and sends the converted command to the second communication unit 133. The second communication unit 133 sends the received command to the indoor unit 110.

In the indoor unit 110, the device-side communication unit 115 receives the command and supplies the command to the device-side control unit 116. According to the received command, the device-side control unit 116 adjusts the directions of the horizontal air direction vanes 112, and adjusts the air volume from the fan 111 by adjusting the revolution speed of the motor 114.

Subsequently, the terminal-side control unit 155 makes the display unit 151 display an indoor unit selection screen image for selecting indoor units 110 for which the direction of the vertical air direction vanes 113 will be inputted (S21).

Figure 16:
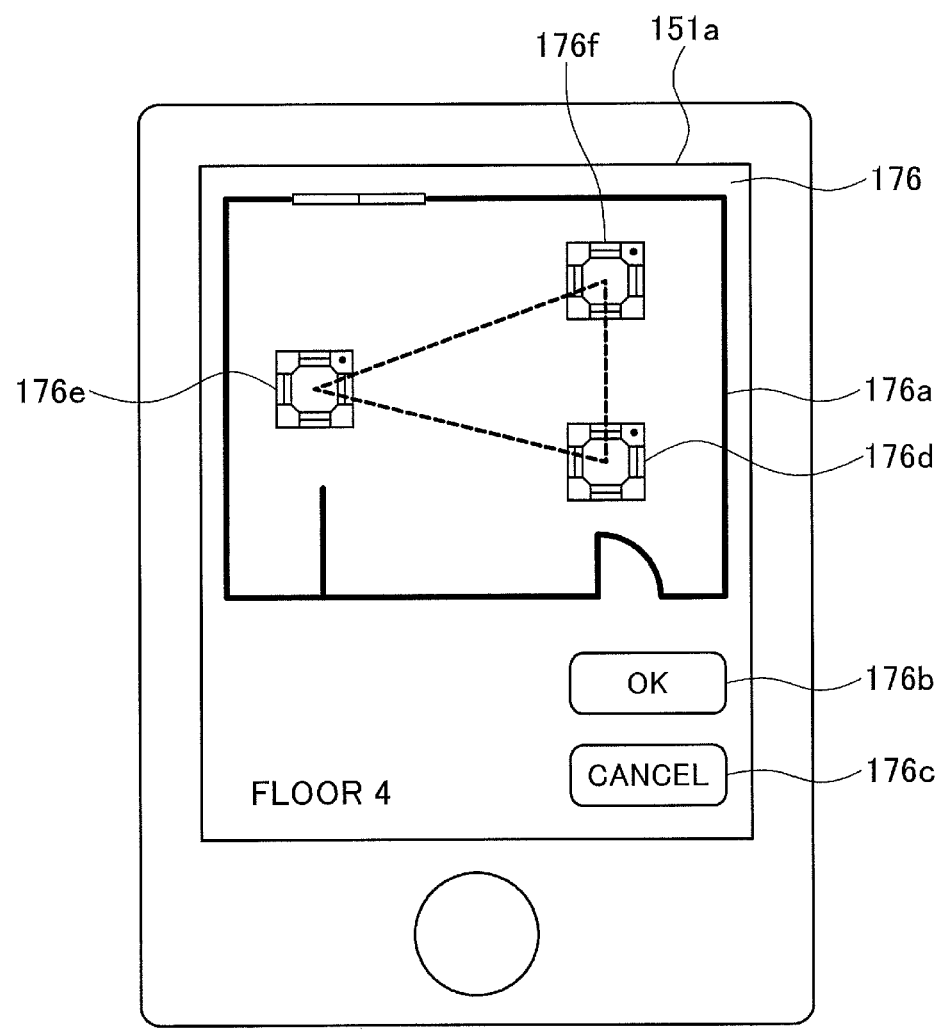
FIG. 16 is a schematic diagram showing an example of an indoor unit selection screen image.

FIG. 16 is a schematic diagram showing an example of the indoor unit selection screen image.

As shown in FIG. 16, the indoor unit selection screen image 176 includes a partial image 176a schematically showing the layout of the room, an OK button 176b as an input region for representing completion of the input of the direction in the vertical direction, and a CANCEL button 176c as an input region for representing cancellation of the input.

Incidentally, the indoor unit selection screen image 176 is displayed on the display screen 151a of the display unit 151.

Here, in the partial image 176a, icons 176d, 176e and 176f corresponding to the indoor units 110 are arranged, and every pair that can be formed from the icons 176d, 176e and 176f is connected to each other by a broken line.

Subsequently, on the indoor unit selection screen image 176, the user selects a pair of indoor units 110 for which vertical air directions will be inputted (S22).

For example, by use of the display unit 151 and the input unit 152, the user selects a broken line, connecting the icons corresponding to the pair of indoor units 110 for which the vertical air directions will be inputted, from the broken lines included in the partial image 176a. When the selection is made by the user, the process proceeds to step S23.

In the step S23, the terminal-side control unit 155 makes the display unit 151 display a vertical air direction input screen image for inputting the vertical air directions of the selected indoor units 110.

Figure 17:
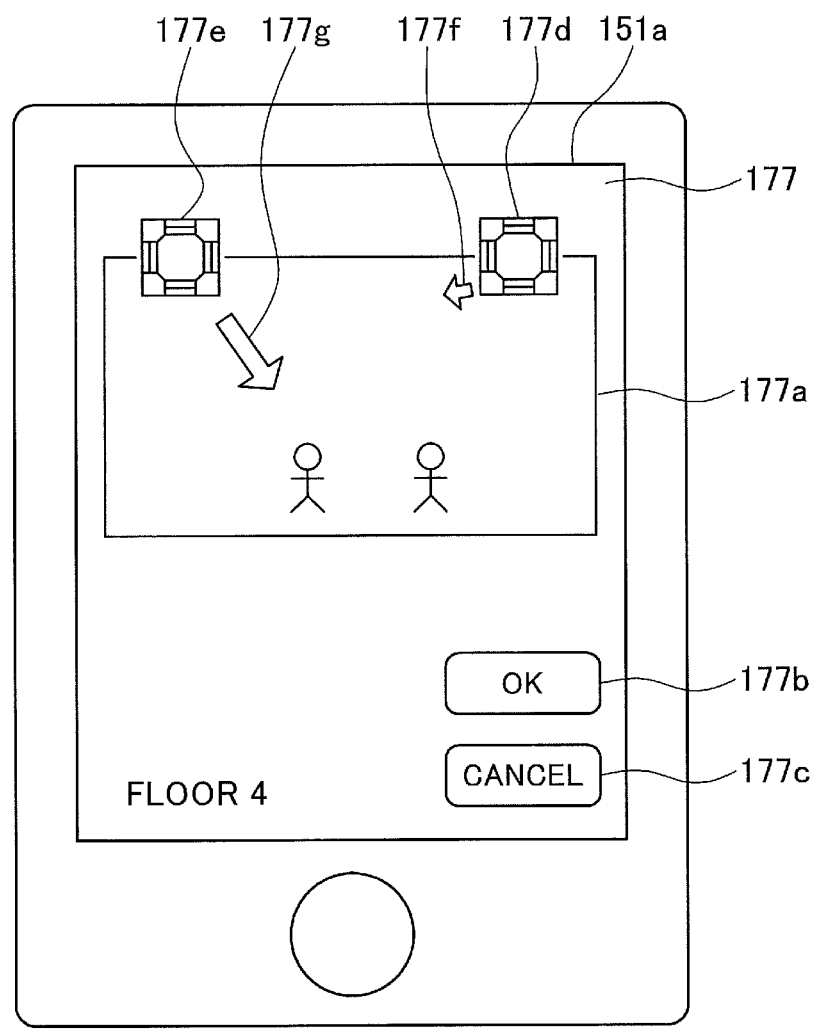
FIG. 17 is a schematic diagram showing an example of a vertical air direction input screen image.

FIG. 17 is a schematic diagram showing an example of the vertical air direction input screen image.

As shown in FIG. 17, the vertical air direction input screen image 177 includes a partial image 177a for inputting the air directions of the selected indoor units 110, an OK button 177b as an input region for representing completion of the input of the vertical air directions of the selected indoor units 110, and a CANCEL button 177c as an input region for representing cancellation of the input.

Incidentally, the vertical air direction input screen image 177 is displayed on the display screen 151a of the display unit 151.

Here, in the partial image 177a, icons 177d and 177e corresponding to the selected indoor units 110 are arranged, and arrows 177f and 177g indicating the vertical air directions of the selected indoor units 110 are displayed. Incidentally, the length of each of the arrows 177f, 177g is assumed to correspond to the length of the trace inputted in the step S17 (air volume). Further, the directions of the arrows 177f, 177g are the directions of the vertical air direction vanes 113 of the corresponding indoor unit.

Subsequently, on the vertical air direction input screen image 177, the user changes a vertical air direction when necessary (S24).

For example, by use of the display unit 151 and the input unit 152, the user changes the vertical air direction by changing the direction indicated by the arrow 177f or 177g included in the partial image 177a.

When the user presses the OK button 177b, the terminal-side control unit 155 stores the settings of the directions of the vertical air direction vanes 113 corresponding to the arrows shown in the vertical air direction input screen image 177 in the terminal-side storage unit 154 while associating the settings with the indoor units 110, and makes the process proceed to step S25. In contrast, when the user presses the CANCEL button 177c, the terminal-side control unite 155 cancels the change inputted to the vertical air direction input screen image 177 and makes the process proceed to the step S25.

In the step S25, the terminal-side control unit 155 makes the display unit 151 display the indoor unit selection screen image 176 (see FIG. 16) again.

Then, when the user selects a broken line connecting icons corresponding to a pair of indoor units 110 for which the vertical air directions will be inputted (Yes in S26), the process returns to the step S23. In contrast, when the user presses the OK button 176b or the CANCEL button 176c (No in S26), the process proceeds to step S27.

In the step S27, when the user pressed the CANCEL button 176c (Yes in S27), the terminal-side control unit 155 deletes the settings of the directions of the vertical air direction vanes 113 of the indoor units 110 stored in the terminal-side storage unit 154 and ends the process. In contrast, when the user pressed the OK button 176b (No in S27), the terminal-side control unit 155 makes the process proceed to step S28.

In the step S28, the operation terminal 150 makes the setting of the vertical air direction vanes 113 of each indoor unit 110. While each indoor unit 110 includes a plurality of vertical air direction vanes 113 in this embodiment, it is assumed that one indoor unit 110 has one setting of the vertical air direction vanes 113.

For example, the terminal-side control unit 155 of the operation terminal 150 generates a command (second command) indicating the settings of the directions of the vertical air direction vanes 113 for each indoor unit 110 according to the settings of the directions of the vertical air direction vanes 113 of each indoor unit 110 stored in the terminal-side storage unit 154. Then, the terminal-side control unit 155 sends the generated command to the terminal-side communication unit 153, and the terminal-side communication unit 153 transmits the command to each remote control 130.

In each remote control 130, the first communication unit 132 receives the command regarding the indoor unit 110 connected to each remote control 130 and sends the received command to the control unit 134. The control unit 134 converts the received command into a command for the indoor unit 110 and sends the converted command to the second communication unit 133. The second communication unit 133 sends the received command to the indoor unit 110.

In the indoor unit 110, the device-side communication unit 115 receives the command and supplies the command to the device-side control unit 116. According to the received command, the device-side control unit 116 adjusts the directions of the vertical air direction vanes 113.

Incidentally, when the settings of the directions of the vertical air direction vanes 113 of each indoor unit 110 has not been stored in the terminal-side storage unit 154 in the step S28, the operation terminal 150 ends the process without making the settings of the vertical air direction vanes 113 of each indoor unit 110.

As described above, according to this embodiment, the settings of the horizontal air direction vanes 112 and the vertical air direction vanes 113 of a plurality of indoor units 110 can be made with ease.

For example, the user can input a straight line trace indicating an airflow to the display screen 151a of the operation terminal 150 and thereby set the air direction and the air volume corresponding to such a trace to at least one indoor unit 110.

Further, since the contents of the setting made by the user by inputting the trace is displayed as the air direction air volume confirmation screen image 174, the user can easily check the contents of the setting made by the user himself/herself.

Furthermore, since the temperature distribution based on the contents of the setting made by the user by inputting the trace is displayed as the temperature distribution confirmation screen image 175, the user can easily check the effect of the contents of the setting made by the user himself/herself.

Moreover, the user can set the vertical air directions of two indoor units 110 by using one screen image.

In the embodiment described above, the terminal-side control unit 155 receives the input of a straight line trace indicating an airflow to the airflow input screen image 173 as shown in FIG. 11; however, the embodiment is not limited to such an example.

Figure 18:
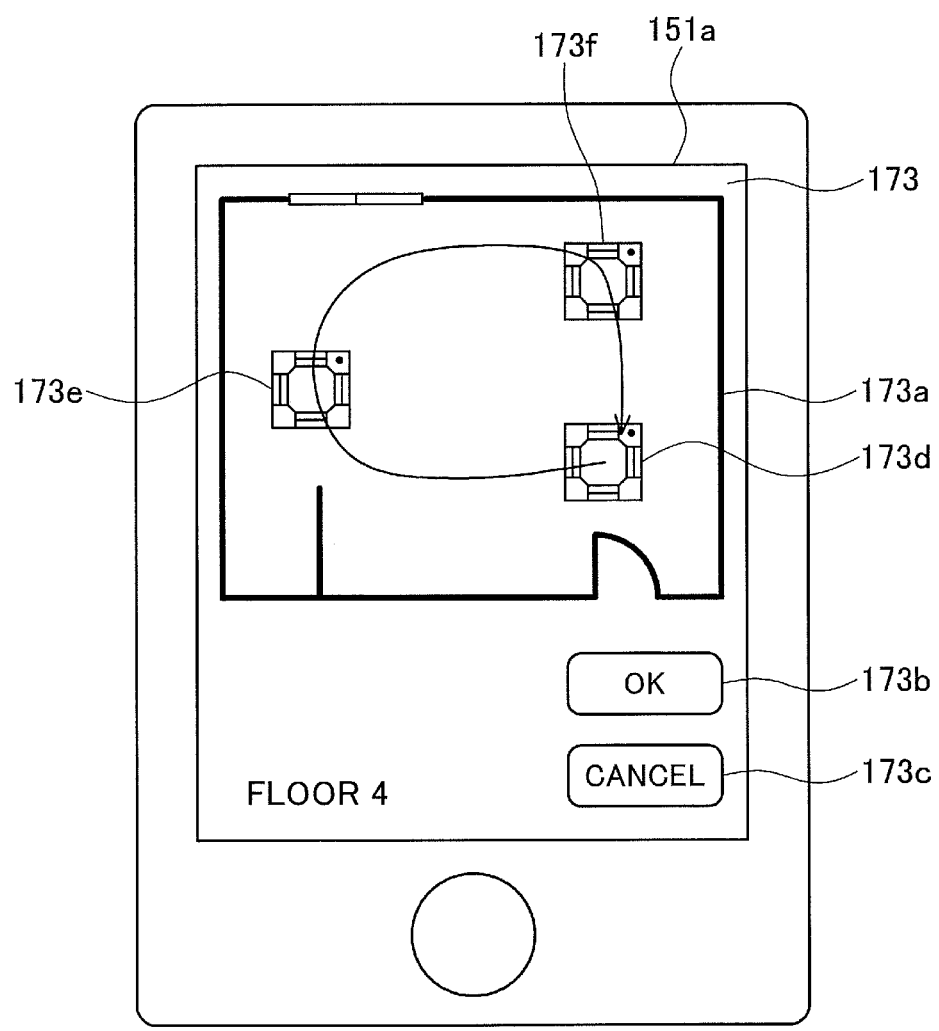
FIG. 18 is a schematic diagram showing a modification of the input to the airflow input screen image.

For example, as shown in FIG. 18, the terminal-side control unit 155 may receive an input of a curved line connecting two or more icons 173d, 173e, 173f together with one curved line as a trace indicating an airflow.

In such cases, the terminal-side control unit 155 may determine the air direction and the air volume by approximating each curved line between two icons with a straight line. The air volume in this case is the distance between the two icons.

Specifically, the terminal-side control unit 155 identifies two icons connected by the curved line as a first icon and a second icon according to the order in which the inputted trace passes through the icons. Then, the terminal-side control unit 155 determines the direction from a starting point to an endpoint of an approximate straight line obtained by approximating a part of the inputted curved line between the first icon and the second icon with a straight line as a horizontal air direction of a first indoor unit 110 corresponding to the first icon, determines the air volume of the first indoor unit 110 so that the air volume from the first indoor unit 110 increases with the increase in the distance between the first icon and the second icon, and generates a command for setting the determined air direction and the determined air volume to the first indoor unit 110.

According to the above-described modification, the user can set the air directions and the air volumes of a plurality of indoor units 110 with ease by inputting one curved line by use of one screen image.

While the control unit 134 of the remote control 130 in the embodiment described above converts the command received by the first communication unit 132 into a command interpretable by the indoor unit 110 connected to the remote control 130 and sends the converted command to the indoor unit 110 via the second communication unit 133, the embodiment is not limited to such an example.

For example, in cases where the operation terminal 150 is capable of generating a command interpretable by the indoor unit 110, the control unit 134 of the remote control 130 may send the command received by the first communication unit 132 to the indoor unit 110 via the second communication unit 133 without change. In such cases, the remote control 130 functions as a relay device that just relays commands.

Further, in cases where the operation terminal 150 is capable of generating a command interpretable by the indoor unit 110, the command may be directly transmitted from the operation terminal 150 to the indoor unit 110.

Figure 19:
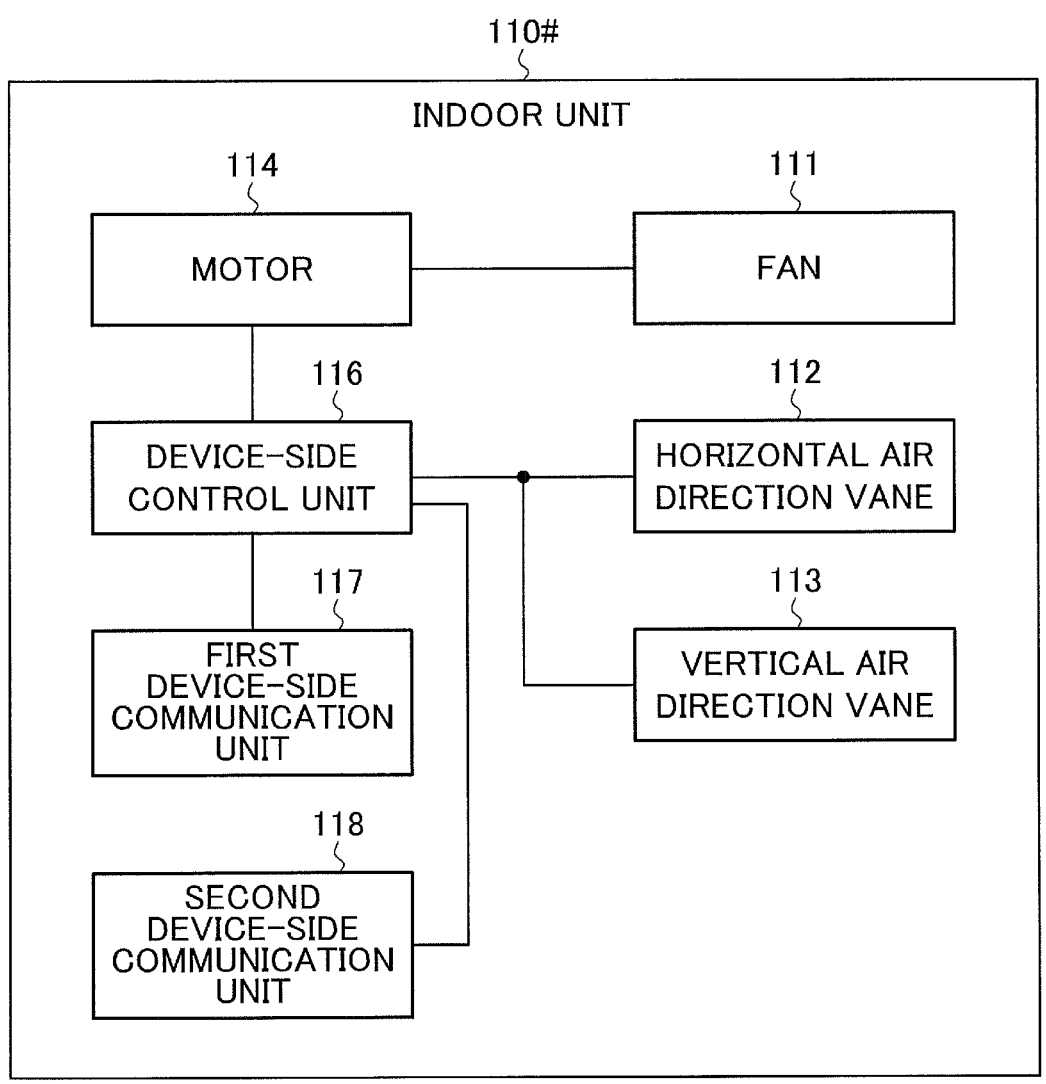
FIG. 19 is a block diagram schematically showing the configuration of an indoor unit according to a modification.

In such cases, as shown in FIG. 19, the indoor unit 110 # may include a first device-side communication unit 117 that performs communication with the remote control 130 and a second device-side communication unit 118 that performs communication with the operation terminal 150.

In cases where the device-side communication unit 115 shown in FIG. 2 and the second communication unit 133 shown in FIG. 4 communicate with each other by radio, the device-side communication unit 115 shown in FIG. 2 may perform the communication with the terminal-side communication unit 153 of the operation terminal 150 by radio.

Furthermore, the terminal-side control unit 155 of the operation terminal 150 may generate a command for a remote control 130 (remote control command) and send the command to the remote control 130 via the terminal-side communication unit 153, and the control unit 134 of the remote control 130 may generate a command interpretable by the indoor unit 110 connected to the remote control 130 (indoor unit command) according to the received command and send the generated command to the indoor unit 110 via the second communication unit 133.

While the indoor unit 110 in the embodiment described above has been assumed to be an indoor unit of the ceiling cassette type for air conditioning having air outlet ports in four directions, this embodiment is not limited to such an example. The indoor unit 110 may have one or more air outlet ports. Accordingly, the indoor unit 110 may include one or more horizontal air direction vanes 112 and one or more vertical air direction vanes 113.

What is claimed is:

1. An operation terminal to control settings of a plurality of indoor units installed in a room in order to condition air in the room, comprising:
   a touch screen to display an airflow input screen image indicating a plurality of icons corresponding to the plurality of indoor units and a layout of the room and to receive a user input operation on the touch screen displaying the airflow input screen image; and
   a communication interface to transmit a first command for setting an air direction and air volume corresponding to a trace resulting from the user input operation to at least one of the plurality of indoor units.

2. The operation terminal according to claim 1, further comprising a processing circuitry to generate the first command, wherein
   the touch screen receives a straight line indicating an airflow from at least one icon out of the plurality of icons as the user input operation, and
   the processing circuitry determines a direction from a starting point to an endpoint of the straight line as a horizontal air direction of at least one indoor unit corresponding to the at least one icon out of the plurality of indoor units, determines the air volume of the at least one indoor unit so that the air volume from the at least one indoor unit increases with an increase in a length of the straight line, and generates the first command for setting the determined air direction and the determined air volume on the at least one indoor unit.

3. The operation terminal according to claim 2, wherein the processing circuitry makes a setting so that a direction of at least one horizontal air direction vane out of a plurality of horizontal air direction vanes for adjusting the horizontal air direction matches the determined air direction in the at least one indoor unit and makes a setting so that air volume from a fan in the at least one indoor unit matches the determined air volume.

4. The operation terminal according to claim 3, wherein the touch screen displays an air direction air volume confirmation screen image indicating the plurality of icons, the layout, the direction of the at least one horizontal air direction vane in the plurality of indoor units corresponding to the plurality of icons, and the air volume from the fan in the plurality of indoor units corresponding to the plurality of icons.

5. The operation terminal according to claim 2, wherein the touch screen displays a temperature distribution confirmation screen image indicating the plurality of icons, the layout, and temperature distribution in the room at the determined air direction and the determined air volume.

6. The operation terminal according to claim 1, further comprising processing circuitry to generate the first command, wherein the touch screen receives a curved line that passes through a first icon and a second icon out of the plurality of icons in an order of the first icon and the second icon as the user input operation, and
   the processing circuitry determines a direction from a starting point to an endpoint of an approximate straight line obtained by approximating a part of the curved line between the first icon and the second icon with a straight line as a horizontal air direction of a first indoor unit corresponding to the first icon out of the plurality of indoor units, determines the air volume of the first indoor unit so that the air volume from the first indoor unit increases with an increase in a distance between the first icon and the second icon, and generates the first command for setting the determined air direction and the determined air volume on the first indoor unit.

7. The operation terminal according to claim 6, wherein the processing circuitry makes a setting so that a direction of at least one horizontal air direction vane out of a plurality of horizontal air direction vanes for adjusting the horizontal air direction matches the determined air direction in the first indoor unit and makes a setting so that air volume from a fan in the first indoor unit matches the determined air volume.

8. The operation terminal according to claim 7, wherein the touch screen displays an air direction air volume confirmation screen image indicating the plurality of icons, the layout, the direction of the at least one horizontal air direction vane in the plurality of indoor units corresponding to the plurality of icons, and the air volume from the fan in the plurality of indoor units corresponding to the plurality of icons.

9. The operation terminal according to claim 6, wherein the touch screen displays a temperature distribution confirmation screen image indicating the plurality of icons, the layout, and temperature distribution in the room at the determined air direction and the determined air volume.

10. The operation terminal according to claim 1, wherein
   the touch screen displays an indoor unit selection screen image indicating the plurality of icons and the layout,
   the touch screen receives as the user input operation a selection of, out of the plurality of icons, two icons corresponding to two indoor units for which vertical air directions will be set on the display screen displaying the indoor unit selection screen image,
   the touch screen displays a vertical air direction input screen image indicating the two icons and arrows representing the vertical air directions from the two indoor units corresponding to the two icons, the touch screen receives input for changing a direction of at least one of the arrows on the display screen displaying the vertical air direction input screen image, and the communication interface transmits a second command for setting a vertical air direction on at least one of the two indoor units according to the changed direction.

11. A non-transitory computer-readable medium that stores therein a program that causes a computer having a display screen to function as an operation terminal to control settings of a plurality of indoor units installed in a room in order to condition air in the room, wherein the program causes the computer to execute processes of:

causing the display screen to display an airflow input screen image indicating a plurality of icons corresponding to the plurality of indoor units and a layout of the room;

receiving a user input operation on the display screen displaying the airflow input screen image; and transmitting a first command for setting an air direction and air volume corresponding to a trace resulting from the user input operation to at least one of the plurality of indoor units.

12. An air-conditioning system comprising a plurality of indoor units installed in a room in order to condition air in the room and an operation terminal to control settings of the plurality of indoor units, wherein the operation terminal includes:

a touch screen with a display screen to display an airflow input screen image indicating a plurality of icons corresponding to the plurality of indoor units and a layout of the room;

wherein the touch screen is configured to receive a user input operation on the display screen displaying the airflow input screen image; and a communication interface to transmit a first command for setting an air direction and air volume corresponding to a trace resulting from the user input operation to at least one of the plurality of indoor units.

* * * * *